United States Patent [19]
Wu et al.

[11] Patent Number: 5,898,967
[45] Date of Patent: May 4, 1999

[54] FLEXIBLE TOOTHBRUSH

[76] Inventors: Jian Zhi Wu; Rui Qing Lai, both of 28 Monie Ave., East Hills, N.S.W. 2213, Australia

[21] Appl. No.: 08/962,475

[22] Filed: Oct. 31, 1997

Related U.S. Application Data

[63] Continuation-in-part of application No. 08/949,093, Oct. 10, 1997.

[51] Int. Cl.⁶ .................................................... A46B 9/04
[52] U.S. Cl. ........................... 15/167.1; 15/144.1; 15/172
[58] Field of Search ............... 15/143.1, 144.1, 15/167.1, 172

[56] References Cited

U.S. PATENT DOCUMENTS

| | | | |
|---|---|---|---|
| 759,490 | 5/1904 | Yates | 15/143.1 |
| 882,021 | 3/1908 | Schigelinsky | 15/211 |
| 2,438,268 | 3/1948 | Bressler | 15/167.1 |
| 2,443,297 | 6/1948 | Bressler | 15/167.1 |
| 2,664,582 | 1/1954 | Kammann | 15/143.1 |
| 3,609,789 | 10/1971 | Slater | 15/104.94 |
| 4,829,621 | 5/1989 | Phenegar | 15/172 |
| 5,052,071 | 10/1991 | Halm | 15/167.1 |
| 5,054,154 | 10/1991 | Schiffer et al. | 15/167.1 |
| 5,630,244 | 5/1997 | Chang | 15/167.1 |

FOREIGN PATENT DOCUMENTS

| | | | |
|---|---|---|---|
| 155730 | 9/1932 | Switzerland | 15/167.1 |
| 673516 | 6/1952 | United Kingdom . | |
| 1158936 | 7/1969 | United Kingdom . | |
| 88-01480 | 3/1988 | WIPO . | |
| 93-15627 | 8/1993 | WIPO . | |

*Primary Examiner*—Mark Spisich
*Attorney, Agent, or Firm*—Thomas I. Rozsa; Tony D. Chen; Jerry Fong

[57] ABSTRACT

An improved flexible toothbrush for enhancing the brushing of an individual. The flexible toothbrush comprises a bristle head portion, a neck portion and a handle portion integrally connected to the bristle head portion by the neck portion. An elongated flat flexible leaf-spring is embedded within the body of the toothbrush and extends partially in the head portion through the entire neck portion and the end of the handle portion for providing flexibility on the body of the toothbrush and enhancing the brushing of teeth of an individual. The flexible leaf-spring comprises a pair of spaced apart zig-zag sections which located between the head and neck portions and the beginning of the handle portion to further increase the flexibility on the body of the toothbrush.

12 Claims, 6 Drawing Sheets

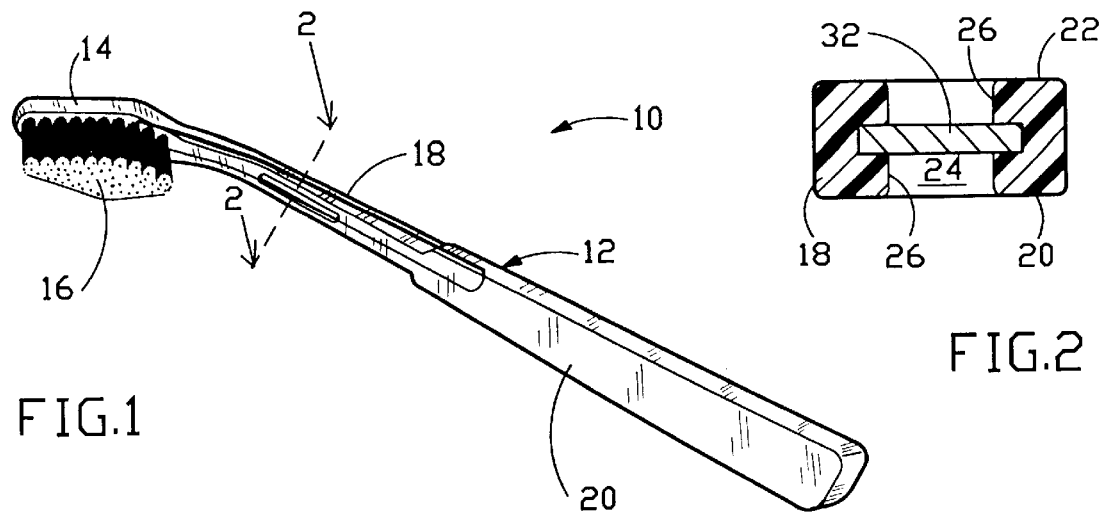
FIG.1
FIG.2
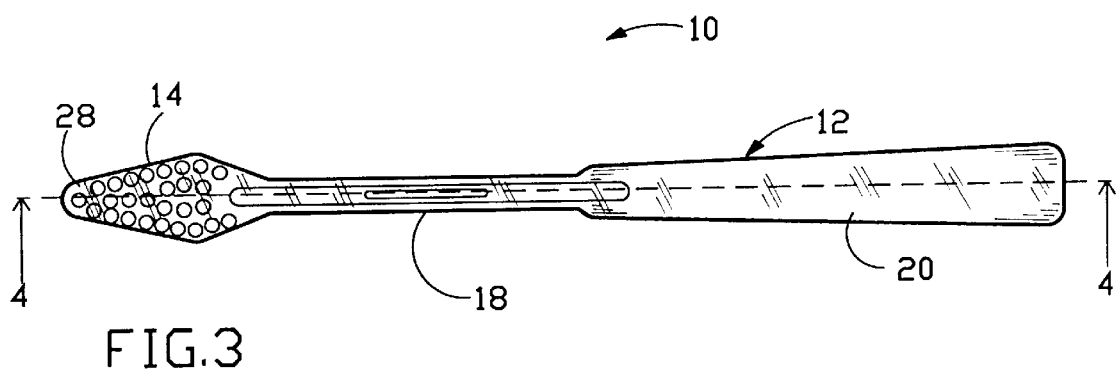
FIG.3
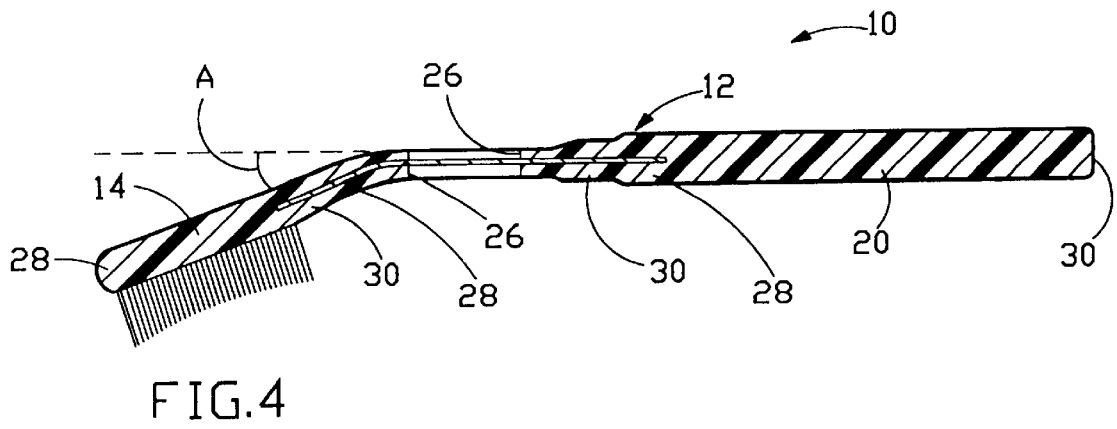
FIG.4

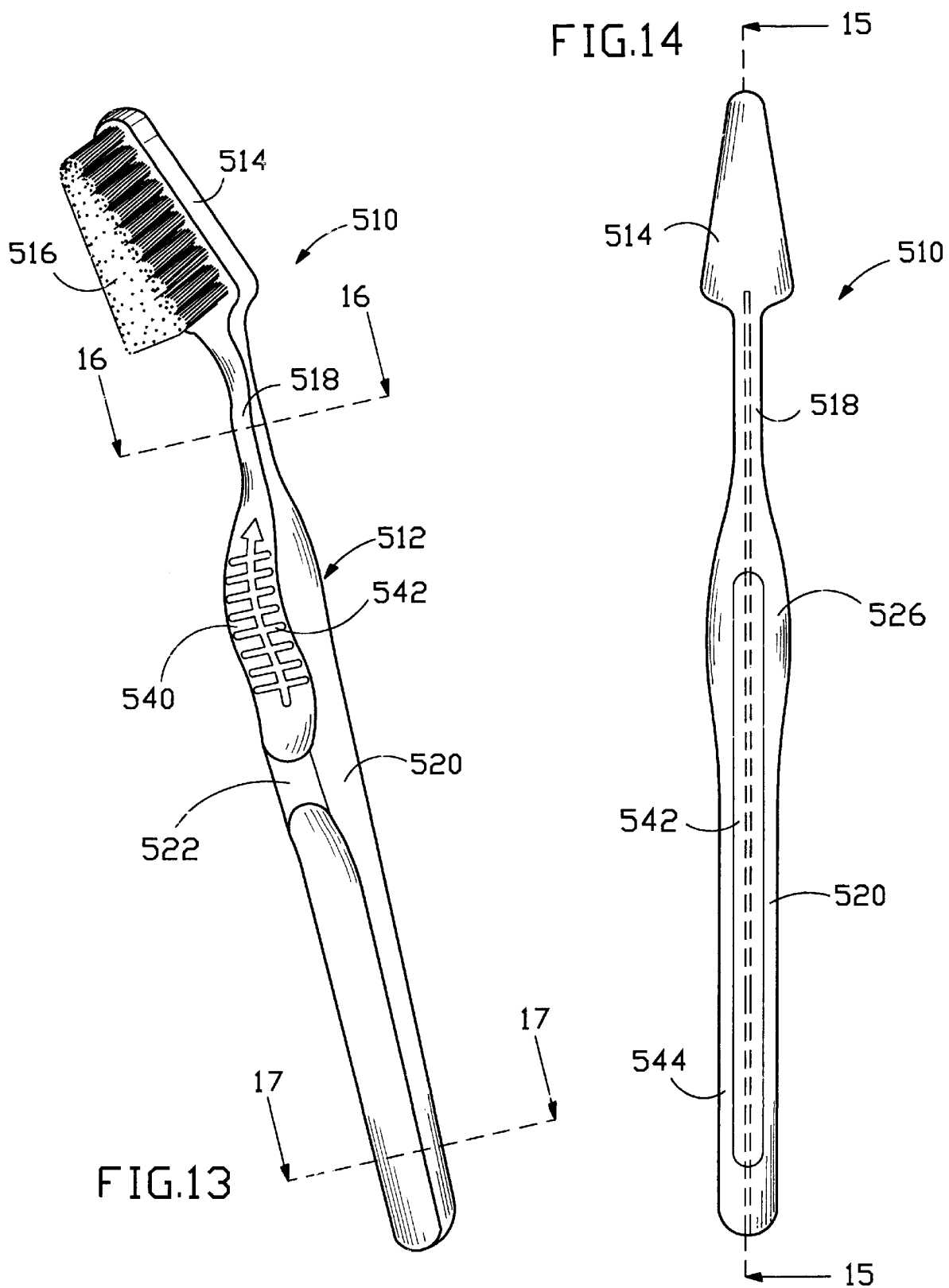

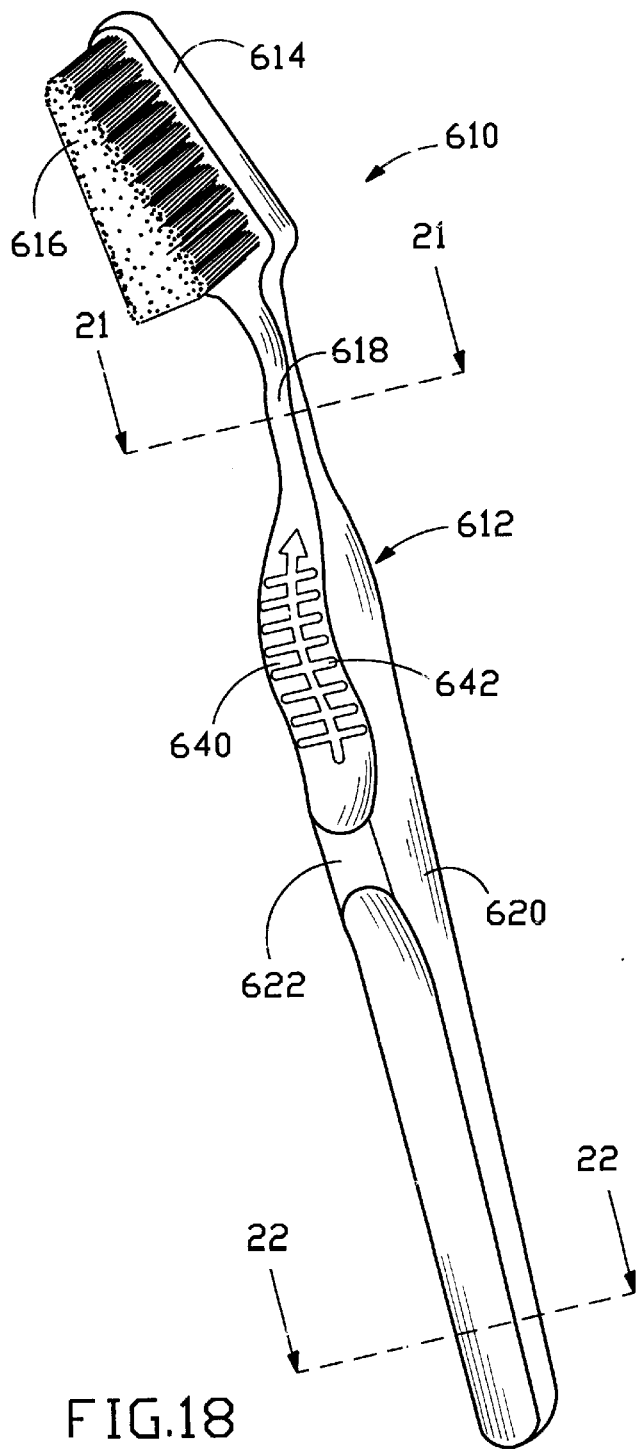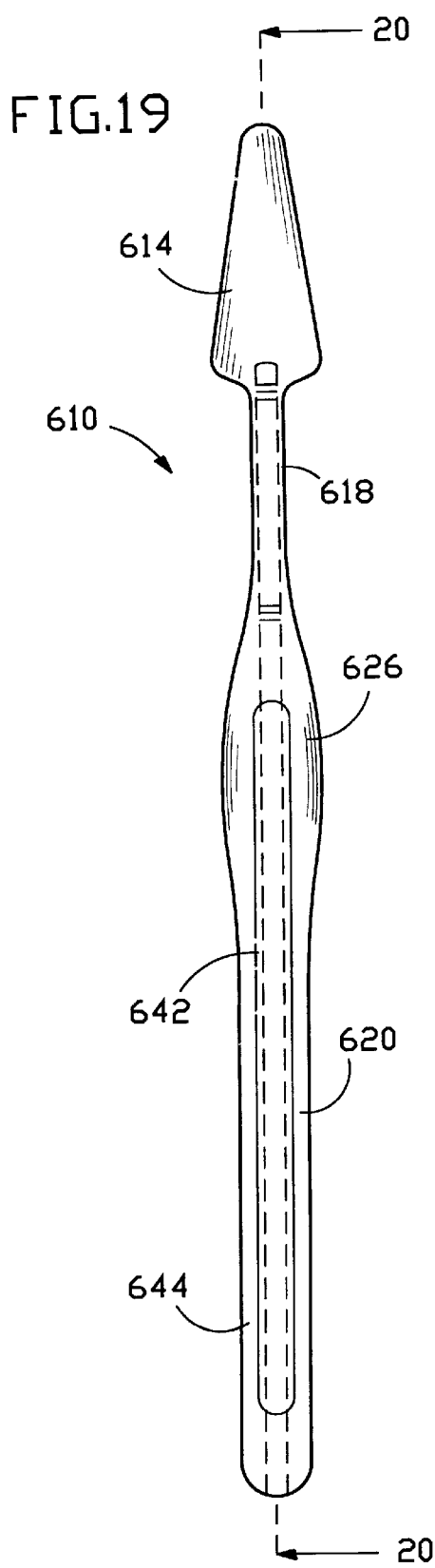

FLEXIBLE TOOTHBRUSH

This application is a continuation-in-part of application Ser. No. 09/949,093 filed on Oct. 10, 1997, now pending.

BACKGROUND OF THE INVENTION

1. Field of the Invention

The present invention generally relates to the field of dental care. More particularly, the present invention relates to toothbrushes.

2. Description of the Prior Art

Prior art toothbrushes are comprised of a head portion with bristles, a neck portion and a handle portion. It is common to have the head portion aligned with the handle portion to form a standard straight toothbrush. The problem with this straight toothbrush is that the head portion is not bendable, thereby providing less reach when an individual brushes his or her teeth. Another prior art toothbrush has a head portion that is bent at an angle to provide improved reach when brushing. However, this prior art toothbrush is made of a solid plastic material, where the plastic material is rigid which does not provide flexibility when brushing. The plastic material can crack after time, thereby causing injure to the gums of the individual.

It is highly desirable to have a very efficient and also very effective design and construction of a flexible toothbrush, where the neck portion is improved to provide flexibility for an individual to brush his or her teeth. It is also desirable to provide a flexible toothbrush that is made of a semi-rigid plastic material, where the neck portion can be bendable under pressure and will not crack when brushing.

The following thirteen (13) prior art patents are found to be pertinent to the field of the present invention:

1. U.S. Pat. No. 882,021 issued to Schigelinsky on Mar. 17, 1908 for "Bottle Cleaner" (hereafter the "Schigelinsky Patent");
2. U.S. Pat. No. 2,438,268 issued to Bressler on Mar. 23, 1948 for "Flexible Bristle Head Toothbrush" (hereafter the "'268 Bressler Patent");
3. U.S. Pat. No. 2,443,297 issued to Bressler on Jun. 15, 1948 for "Toothbrush" (hereafter the "'297 Bressler Patent");
4. U.S. Pat. No. 3,609,789 issued to Slater on Oct. 5, 1971 for "Disposable Toothbrush And Method Of Making The Same" (hereafter the "Slater Patent");
5. U.S. Pat. No. 4,829,621 issued to Phenegar on May 16, 1989 for "Toothbrush" (hereafter the "Phenegar Patent");
6. U.S. Pat. No. 5,052,071 issued to Halm on Oct. 1, 1991 for "Toothbrush With Displaceable Head" (hereafter the "'071 Halm Patent");
7. U.S. Pat. No. 5,054,154 issued to Schiffer et al. on Oct. 8, 1991 for "Toothbrush With Flexible Head" (hereafter the "Schiffer Patent");
8. Patent Cooperation Treaty No. WO 88/01,480 issued to Choi on Mar. 10, 1988 for "Massage Toothbrush" (hereafter the "Choi Patent");
9. Patent Cooperation Treaty No. WO 93/15,627 issued to Halm on Aug. 19, 1993 for "Flexibly Resilient Toothbrush Handle" (hereafter the"'627 Halm Patent");
10. Great Britain Patent No. 673,516 for "Improvements In And Relating To Toothbrushes" (hereafter the"'516 GB Patent");
11. Great Britain Patent No. 1,158,936 for "Improvements Relating To Hair-Brushes" (hereafter the "'936 GB Patent");
12. Switzerland Patent No. 155,730 (hereafter the "'730 Switzerland Patent" ); and
13. Switzerland Patent No. 312,125 (hereafter the "'125 Switzerland Patent").

The Schigelinsky Patent discloses a bottle cleaner. It comprises a handle section and a cleaning section hingeable connected to the handle section.

The '268 Bressler Patent discloses a flexible bristle head toothbrush. It comprises a head portion which includes a plurality of bristle supporting sections which are spaced apart and joined together by connectors with a resilient yieldable member extending through the sections and connectors.

The '297 Bressler Patent discloses a toothbrush. It comprises a handle portion and a head portion. A spring member is integrally molded within the head portion.

The Slater Patent discloses a disposable toothbrush and method of making the same. The toothbrush is formed from a sheet of plastic material which is rolled into an elongated cylindrical body. A deformable pin is embedded in the plastic sheet material to hold the bristles at one axial end of the body at an angle to a handle portion when the body is bent at a location spaced from the bristles.

The Phenegar Patent discloses a toothbrush. It comprises a bristle head, a neck, and a handle connected to the head by the neck. A deformable insert is provided on the neck and extends through the neck and partially extending into the head and handle.

The '071 Halm Patent discloses a toothbrush with a displaceable head. It comprises a toothbrush body with a head portion formed at an angle relative to the neck and a resiliently flexible portion with five alternatively inverted, transverse, V-shaped folds, where the flexible portion provides flexibility when pressure is applied to the head portion of the toothbrush.

The Schiffer Patent discloses a toothbrush with a flexible head. It comprises a handle, a neck, a bristle head, and an elastic segment between the handle and bristle head. The elastic segment is formed by one or more clearances, slots or slits at least partially filled with elastic polymeric/ copolymeric plastic material.

The Choi Patent discloses a massage toothbrush. It comprises bristles, a thin neck, a flat spring which is inserted into the neck, and a shoulder which is attached to a thick handle.

The '627 Halm Patent discloses a flexibly resilient toothbrush handle. It comprises a flexible resilient region which is between a head portion and a handle portion. The flexible resilient region is an integral corrugated region.

The '516 GB Patent discloses a toothbrush with a leaf spring for connecting a plurality of separate bristle-supporting sections of the head portion together. The leaf spring has holes and notches, all of which are in register with tufts of bristles. Also, the leaf spring is only located on the head portion of the toothbrush and used for holding together the plurality of separate sections on the head portion.

The '936 GB Patent discloses improvements relating to hair-brushes. It comprises a resilient member which connects the handle with the head.

The '730 Switzerland Patent, as disclosed from the figures shows a brush with a wavy neck portion and a thin flexible member formed within a head portion and extending through the neck and handle portions.

The '124 Switzerland Patent, as disclosed from the figure shows a toothbrush with an angle head portion.

It is further desirable to provide an improved toothbrush, where the neck and handle portions provide flexibility for an individual to brush his or her teeth.

SUMMARY OF THE INVENTION

The present invention is a novel and unique flexible toothbrush for enhancing the brushing of an individual.

The flexible toothbrush comprises a head portion, a neck portion and a handle portion. The head portion is integrally formed with the neck portion such that it is at an angle of approximately 0° to 20°. The neck portion has a hollow chamber, where a leaf-spring is embedded within the hollow chamber and is bendable for providing flexibility on the neck portion for enhancing the brushing of an individual.

It is therefore an object of the present invention to provide a toothbrush, where the toothbrush has a head portion, a neck portion and a handle portion such that the head portion is formed at an angle of approximately 0° to 20° for improving the reach to brush an individual's teeth. The neck portion has a flexible leaf-spring integrally formed for increasing the flexibility of the neck portion so that the neck portion is bendable for enhancing the brushing of the individual's teeth.

It is a further object of the present invention to provide a toothbrush having a neck portion, where the neck portion has slot apertures thereon, so that the slot apertures provide increase flexibility on the neck portion, thereby preventing the plastic material used to make the toothbrush from cracking.

In the preferred embodiment of the present invention, the toothbrush is comprised of a head portion, a neck portion and a handle portion. The neck portion has a front side with a slot aperture, a back side with a slot aperture and a hollow chamber. A spring tension is centrally embedded within the hollow chamber such that it is between the slot apertures on the front and back sides of the neck portion.

In an alternative embodiment of the present invention, the spring tension is embedded within the hollow chamber and located adjacent to the front side of the neck portion.

In another alternative embodiment of the present invention, the spring tension is embedded within the hollow chamber and located adjacent to the back side of the neck portion.

In a further embodiment of the present invention, the spring tension is attached to an exterior surface which is located on the front side of the neck portion.

In an additional embodiment of the present invention, the spring tension is attached to an exterior surface which is located on the back side of the neck portion.

In still another embodiment of the present invention, two spring tensions are attached to an exterior surface and located on the front and back sides of the neck portion.

In still a further embodiment of the present invention, the spring tension comprises at least three flexible spaced apart cylindrical members embedded within the hollow chamber of the neck portion.

Alternatively, the present invention is an improved flexible toothbrush for enhancing the brushing of an individual and a method of making the same. The flexible toothbrush comprises a bristle head portion, a neck portion and a handle portion integrally connected to the bristle head portion by the neck portion. An elongated flexible rod member is embedded within the body of the toothbrush and extends partially in the head portion through the entire neck portion and the end of the handle portion for providing flexibility on the body of the toothbrush and enhancing the brushing of teeth of an individual.

It is an object of the present invention to provide an improved flexible toothbrush, where the toothbrush has a bristle head portion, a neck portion, a handle portion, and a flexible rod member integrally formed within and located in the neck and handle portions of the toothbrush for increasing the flexibility of the neck and handle portions and enhancing the brushing of an individual's teeth, and thereby prevents the plastic material used to make the toothbrush from cracking.

Further alternatively, the present invention is an improved flexible toothbrush for enhancing the brushing of an individual. The flexible toothbrush comprises a bristle head portion, a neck portion and a handle portion integrally connected to the bristle head portion by the neck portion. An elongated flat flexible leaf-spring is embedded within the body of the toothbrush and extends partially in the head portion through the entire neck portion and the end of the handle portion for providing flexibility on the body of the toothbrush and enhancing the brushing of teeth of an individual. The flexible leaf-spring comprises a pair of spaced apart zig-zag sections which located between the head and neck portions and the beginning of the handle portion to further increase the flexibility on the body of the toothbrush.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the preferred embodiment of the present invention flexible toothbrush;

FIG. 2 is an enlarged cross-sectional view taken along line 2—2 of FIG. 1;

FIG. 3 is a plan view of the present invention flexible toothbrush;

FIG. 4 is a cross-sectional view taken along line 4—4 of FIG. 3;

FIG. 13 is a perspective view an alternatively preferred embodiment of the present invention flexible toothbrush;

FIG. 14 is a back plan view of the present invention flexible toothbrush shown in FIG.13;

FIG. 18 is a perspective view a further alternative preferred embodiment of the present invention flexible toothbrush;

FIG. 19 is a back plan view of the present invention flexible toothbrush shown in FIG. 18;

DESCRIPTION OF THE PREFERRED EMBODIMENT

Figure 5:
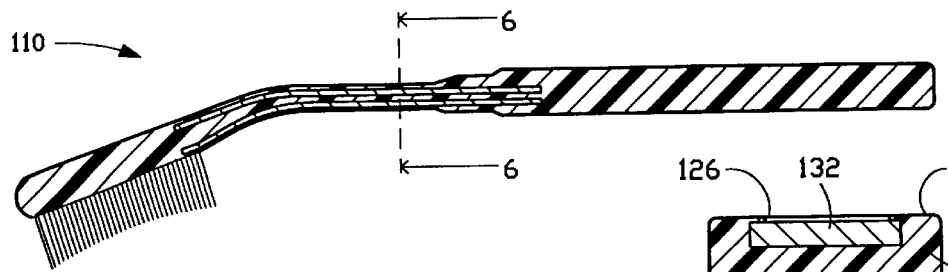
FIG. 5 is a longitudinal cross-sectional of an alternative embodiment of the present invention toothbrush.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to whichthe present invention pertains are deemed to be within the spirit, scope and contemplation of the present invention as further defined in the appended claims.

Referring to FIGS. 1 through 4, there is shown a preferred embodiment of the present invention flexible toothbrush 10. The toothbrush 10 is generally an elongated rectangular shaped body 12 which has a head portion 14 with bristles 16, a neck portion 18 and a handle portion 20. Each of the portions 14, 18 and 20 of the toothbrush 10 have a distal end 28 and a proximal end 30. The proximal end 30 of the head portion 14 is integrally formed with the distal end 28 of the neck portion 18 such that the head portion 14 is at an angle "A" in the range of approximately 0°–20°, preferably 20°. The proximal end 30 of the neck portion 18 is integrally formed with the distal end 28 of the handle portion 20.

The neck portion 18 has a front side 20, a back side 22 and a hollow chamber 24. Each side of the neck portion 18 has a slot aperture 26 which communicates with the hollow chamber 24. The slot apertures 26 are provided for increasing the flexibility of the neck portion 18 and preventing the plastic material used to make the toothbrush 10 from cracking when pressure is applied to bend the neck portion 18.

Referring to FIGS. 2 and 4, there is shown a flexible leaf-spring or spring tension means 32 which is centrally located and embedded within the hollow chamber 24 on the neck portion 18 of the elongated body 12. The flexible spring tension means 32 extends from the proximal end 30 of the head portion 14 to the distal end 28 of the handle portion 20 (see FIG. 4). The spring means 32 is located between the slot apertures 26, where the slot aperture exposes part of the spring means 32. The spring means 32 assists in bending the neck portion 18 when pressure is applied to the head portion 14 of the toothbrush 10 for providing flexibility on the neck portion 18 for enhancing the brushing of an individual's teeth.

Figure 6:
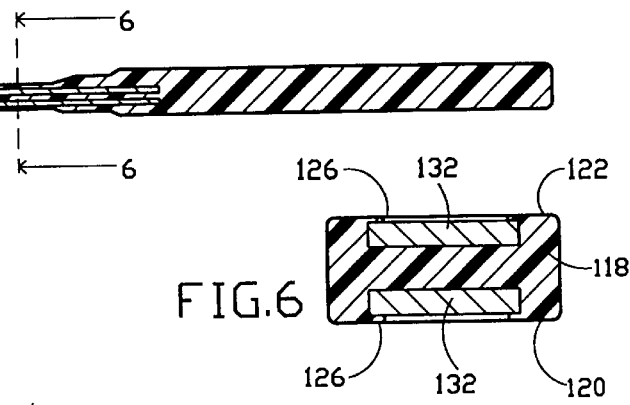
FIG. 6 is an enlarged cross-sectional view taken along line 6—6 of FIG. 5.

Referring to FIGS. 5 and 6, there are shown respective cross sectional views of an alternative embodiment of the present invention toothbrush 110. Since it assembles and functions the same as previously described above except that two spring tension means 132 are substituted for the single spring tension means 32 shown in FIGS. 1 through 4, the parts are numbered correspondingly with 100 added to each reference number. The two spring tension means 132 are integrally formed and located within the neck portion 118 and adjacent to the front and back sides 120 and 122 respectively. The neck portion 118 may have slot apertures 126 for increasing the flexibility of the neck portion 118 and preventing the plastic material used to make the toothbrush 110 from cracking.

Figure 7:
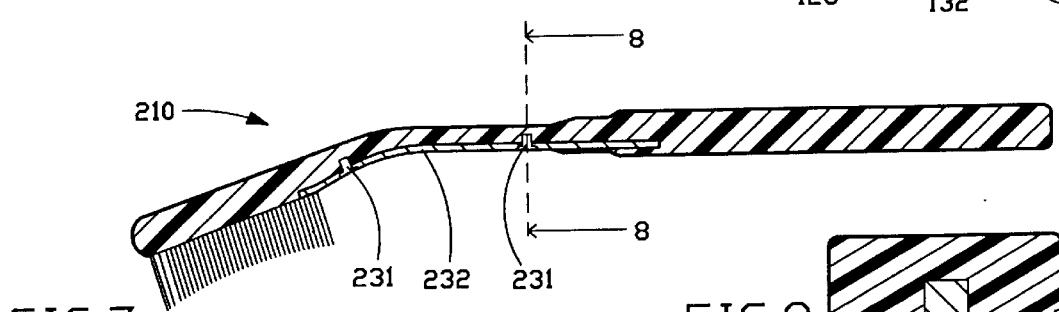
FIG. 7 is a longitudinal cross-sectional of another alternative embodiment of the present invention toothbrush.
Figure 8:
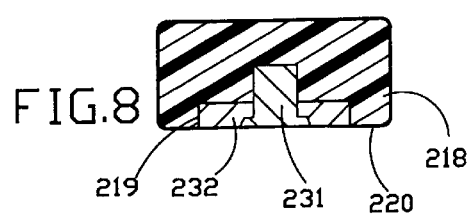
FIG. 8 is an enlarged cross-sectional view taken along line 8—8 of FIG. 7.

Referring to FIGS. 7 and 8, there are shown respective cross sectional views of another alternative embodiment of the present invention toothbrush 210. Since it assembles and functions the same as previously described in FIGS. 1 through 4 except that the spring tension means 232 may be mounted within a groove 219 formed on the neck portion 218 by two opposite screw pin means 231, and located adjacent to the front side 220. The spring tension means 232 may also be mounted to the exterior surface of the front side 220 of the neck portion 218, and therefore, the groove 219 will not be required.

Figure 9:
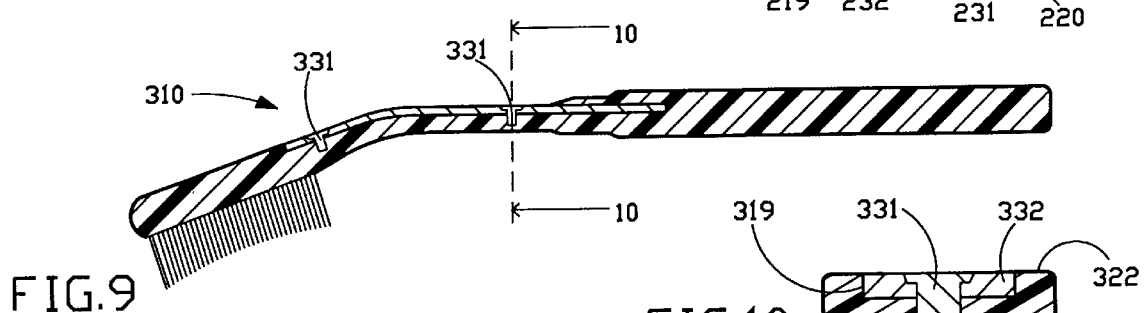
FIG. 9 is a longitudinal cross-sectional of a further alternative embodiment of the present invention toothbrush.
Figure 10:
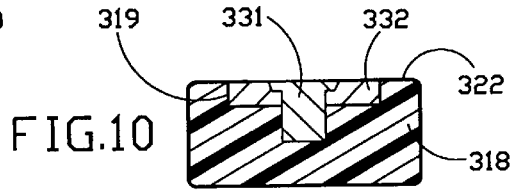
FIG. 10 is an enlarged cross-sectional view taken along line 10—10 of FIG. 9.

Referring to FIGS. 9 and 10, there are shown respective cross sectional views of a further alternative embodiment of the present invention toothbrush 310. Since it assembles and functions the same as previously described in FIGS. 1 through 4 except that the spring tension means 332 may be mounted within a groove 319 formed on the neck portion 318 by two opposite screw pin means 331, and located adjacent to the back side 322. The spring tension means 332 may also be mounted to the exterior surface of the back side 322 of the neck portion 318, and therefore, the groove 319 will not be required.

Figure 11:
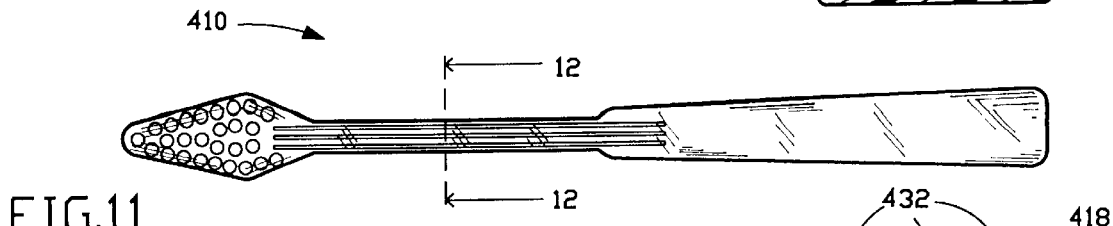
FIG. 11 is a plan view of still another alternative embodiment of the present invention toothbrush.
Figure 12:
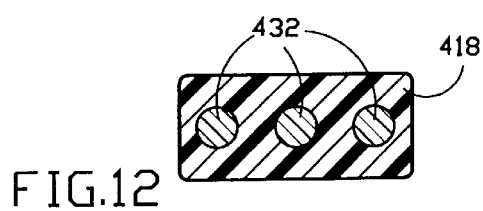
FIG. 12 is an enlarged cross-sectional view taken along line 12—12 of FIG. 11.

Referring to FIGS. 11 and 12, there are shown respective cross sectional views of a further alternative embodiment of the present invention toothbrush 410. Since it assembles and functions the same as previously described in FIGS. 1 through 4 except that the three flexible spaced apart cylindrical shaped members 432 are substituted for the single spring tension means 32 shown in FIGS. 1 through 4, the parts are numbered correspondingly with 400 added to each reference number. The three cylindrical shaped members 432 are integrally formed and centrally located within the neck portion 418.

It will be appreciated that the spring tension means is not limited to the illustrations shown in FIGS. 1 through 12. It is emphasized that while the spring tension means is preferably centrally embedded within the neck portion of the present invention, it is also within the spirit and scope of the present invention to have the spring tension means mounted at a multiplicity of different locations not shown.

The present invention conforms to conventional forms of manufacture or any other conventional way known to one skilled in the art. The toothbrush can be made from several materials. The manufacturing process which could accommodate the construction of the toothbrush may be injection, thermoform, etc. or other molding process. By way of example, the toothbrush can be made of plastic material while the spring tension means can be made of a flexible metal material.

Referring to FIGS. 13 and 14, there are shown respective perspective and plan views of an alternatively preferred embodiment of the present invention flexible toothbrush 510. The toothbrush 510 is generally an elongated shaped body 512 which has a bristle head portion 514 with bristles 516, a thin neck portion 518, and a thick handle portion 520, where the head portion 514 is integrally connected to the handle portion 520 by the neck portion 518. The head portion 514 has an angle "B" in the range of approximately 10°–15° for providing an angle head portion 514 for difficult to reach area when brushing. The thin neck portion 518 increases in thickness as it extends into the handle portion 520 (see FIG. 15). The handle portion 520 has a front side 522 with a thumb resting section 540 and a back side 526 with a palm gripping section 544. The thumb resting section 540 has a longitudinal groove and a plurality of transverse grooves formed with the longitudinal groove. The palm gripping section 544 is provided with a longitudinal recess thereto. These sections 540 and 544 are provided with a non slippery material 542 which are integrally formed thereto and prevent the user's hand from slipping off the handle portion 520 of the toothbrush 510. The non slippery material 542 may be a plastic-like material or any suitable material known to one skilled in the art.

Figure 15:
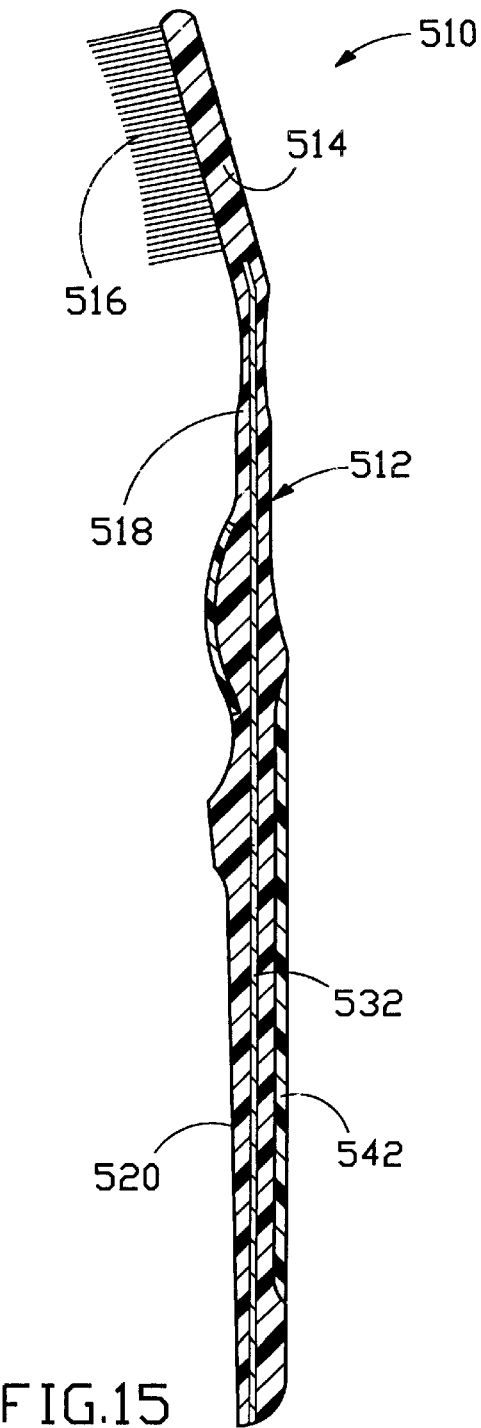
FIG. 15 is a cross-sectional view taken along line 15—15 of FIG. 14.
Figure 16:
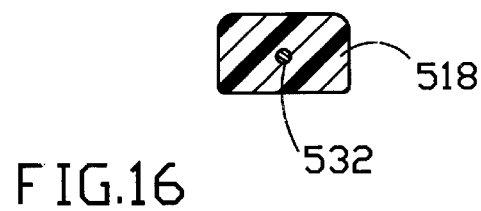
FIG. 16 is an enlarged cross-sectional view taken along line 16—16 of FIG. 15.
Figure 17:
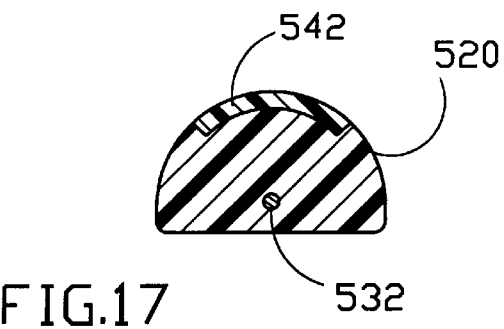
FIG. 17 is an enlarged cross-sectional view taken along line 17—17 of FIG. 15.

FIG. 15 is a cross-sectional view of the present invention flexible toothbrush 510. FIG. 16 is an enlarged cross-sectional view of the neck portion 518 of the flexible toothbrush 510. FIG. 17 is an enlarged cross-sectional view of the handle portion 520 of the toothbrush 510. Referring to FIGS. 15, 16 and 17, there is shown an elongated cylindrical shaped flexible rod member 532 which is integrally molded within the elongated body 512 of the toothbrush 510 and centrally located and within the neck 518 and handle 520 portions. The flexible rod member 532 extends from the end of the head portion 514 through the entire neck portion 518 and to the end of the handle portion 520. The flexible rod member 532 provides flexibility on the neck 518 and handle 520 portions when pressure is applied to those portions for providing flexibility on the neck 518 and handle 520 portions and enhancing the brushing of an individual's teeth. The flexible rod member 532 also provides an insert for increasing the flexibility of the toothbrush 510. In other words, the plastic material used to form the body of the toothbrush made be softer and prevents the elongated body 512 of the toothbrush 510 from breaking when pressure is applied to the elongated body 512.

The present invention conforms to conventional forms of manufacture or any other conventional way known to one skilled in the art. The manufacturing process which could accommodate the construction of the toothbrush may be injection, thermoform, etc. or other molding process. By way of example, the toothbrush can be made of plastic material while the spring tension means can be made of a flexible metal material.

The present invention method of forming a toothbrush comprises several steps. The first step is to provide a mold having an elongated body with a head portion, a neck portion, a handle portion, and a cavity located partially within the head portion and substantially the entire neck and handle portions. The handle portion has a thumb section and a palm section. The second step is to inject a melded thermoplastic material within the cavity of the mold. The third step is to insert a flexible rod member within the cavity of the elongated body of the mold and extends in the longitudinal direction and partially within the head portion and substantially the entire neck and handle portion, where the flexible rod member is flexible for providing flexibility to the body of the toothbrush. The flexible rod member remains within the cavity while the thermoplastic material cools around the flexible rod member. The fourth step is to attach bristles on the head portion of the body. The fifth step is to attach a non slippery material on the thumb and palm sections.

Referring to FIGS. 18 and 19, there are shown respective perspective and plan views of a further alternative preferred embodiment of the present invention flexible toothbrush 610. The toothbrush 610 is generally an elongated shaped body 612 which has a bristle head portion 614 with bristles 616, a thin neck portion 618 and a thick handle portion 620, where the head portion 614 is integrally connected to the handle portion 620 by the neck portion 618. The head portion 614 has an angle "C" in the range of approximately 10°–15° for providing an angle head portion for difficult to reach area when brushing (see FIG. 20). The thin neck portion 618 increases in thickness as it extends into the handle portion 620 (see FIG. 20). The handle portion 620 has a front side 622 with a thumb resting section 640 and a back side 626 with a palm gripping section 644. The thumb resting section 640 has a longitudinal groove and a plurality of transverse grooves formed with the longitudinal groove. The palm gripping section 644 is provided with a longitudinal recess thereto. These sections 640 and 644 are provided with a non slippery material 642 which are integrally formed thereto and prevent the user's hand from slipping off the handle portion 620 of the toothbrush 610. The non slippery material 642 may be a plastic-like material or any suitable material known to one skilled in the art.

Figure 20:
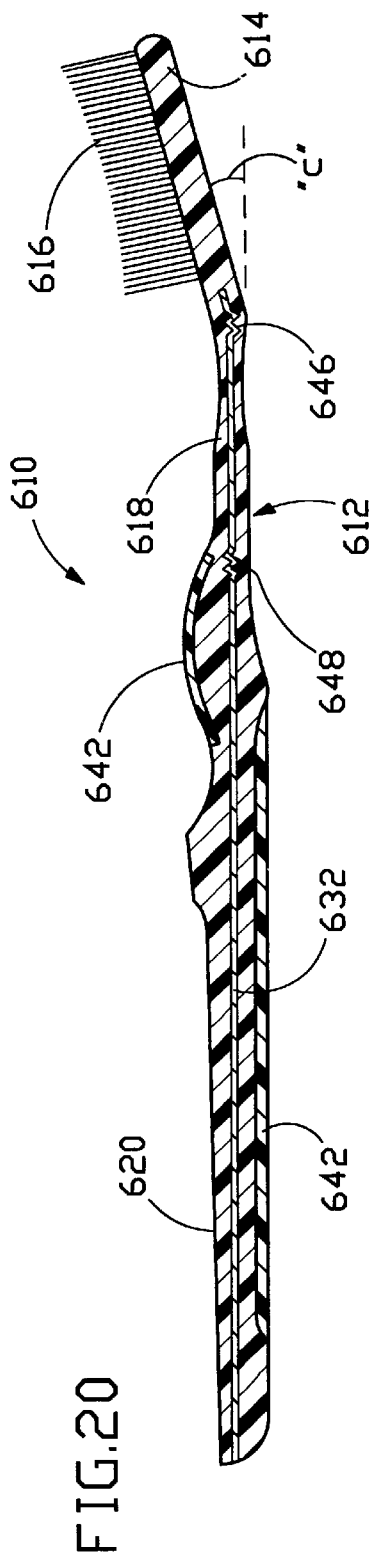
FIG. 20 is a cross-sectional view taken along line 20—20 of FIG. 19.
Figure 23:
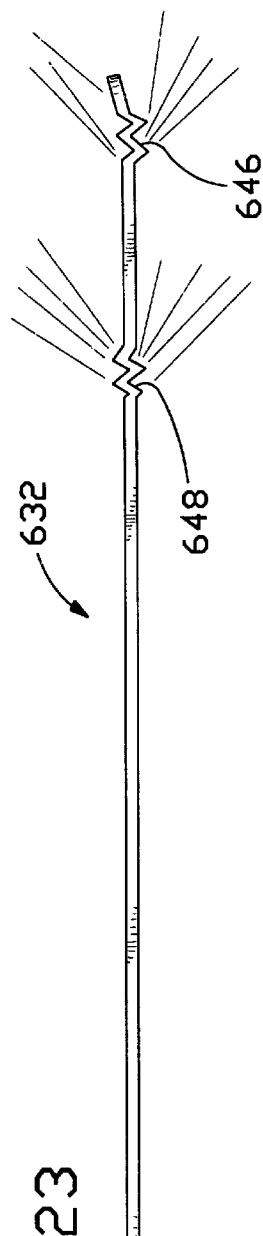
FIG. 23 is an enlarged side elevational view of the flexible leaf-spring, illustrating the different positions that the two zig-zag sections can flex.
Figure 21:
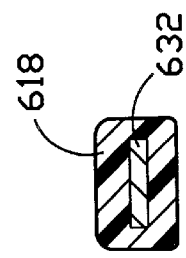
FIG. 21 is an enlarged cross-sectional view taken along line 21—21 of FIG. 18.
Figure 22:
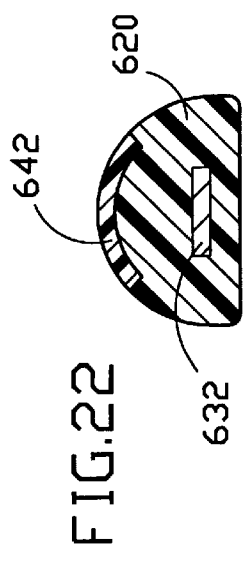
FIG. 22 is an enlarged cross-sectional view taken along line 22—22 of FIG. 18.

FIG. 20 depicts a cross-sectional view of the present invention flexible toothbrush 610. FIG. 21 depicts an enlarged cross-sectional view of the neck portion 618 of the flexible toothbrush 610. FIG. 22 depicts an enlarged cross-sectional view of the handle portion 620 of the toothbrush 610. FIG. 23 depicts an enlarged side elevational view of an elongated flat flexible leaf-spring means 632. Referring to FIGS. 20 through 23, the elongated leaf-spring means 632 is integrally molded within the elongated body 612 of the toothbrush 610 and centrally located and within the neck 618 and handle 620 portions. The flexible leaf-spring means 632 extends from the end of the head portion 614 through the entire neck portion 618 and to the end of the handle portion 620. The flexible leaf-spring means 632 provides flexibility on the neck 618 and handle 620 portions when pressure is applied to those portions for providing flexibility on the neck 618 and handle 620 portions and enhancing the brushing of an individual's teeth. The flexible leaf-spring means 632 also provides an insert for increasing the flexibility of the toothbrush 610. In other words, the plastic material used to form the body of the toothbrush made be softer and prevents the elongated body 612 of the toothbrush 610 from breaking when pressure is applied to the elongated body 612. The leaf-spring means 632 comprises two spaced apart zig-zag sections 646 and 648. The first zig-zag section 646 is located at a location where the head portion 614 and the neck portion 618 are connected. The second zig-zag section 648 is located at a location where the handle portion 620 begins. The zig-zag sections 646 and 648 of the flat leaf-spring means 632 may flex at different positions or angles, thereby further increase the flexibility of the toothbrush (see FIG. 23, which shows lines to illustrate the flexibility of the two zig-zag sections 646 and 648).

The present invention conforms to conventional forms of manufacture or any other conventional way known to one skilled in the art. The manufacturing process which could accommodate the construction of the toothbrush may be injection, thermoform, etc. or other molding process. By way of example, the toothbrush can be made of plastic material while the leaf-spring means can be made of a flexible metal material.

Defined in detail, the present invention is a toothbrush, comprising (a) an elongated body having a handle portion, a neck portion and a head portion with bristles thereon, the handle portion having a front side and a back side, the front side having a thumb section for preventing slipping of a user's hand, and the back side having a palm section for preventing slipping of the user's hand; and (b) an elongated flat flexible leaf-spring having a pair of spaced apart zig-zag sections, the leaf-spring integrally formed within the elongated body and partially extending into the head portion and substantially the entire neck and handle portions, where one of the pair of zig-zag sections is located between the head portion and the neck portion, and the other one of the pair of zig-zag sections is located at the beginning of the handle portion; (c) whereby the flexible leaf-spring increases the flexibility of the elongated body of the toothbrush and the pair of zig-zag sections further increase the flexibility of the body of the toothbrush.

Defined broadly, the present invention is a toothbrush comprising (a) a body having a handle member, a neck member and a head member, the handle member having a thumb area and a palm area; and (b) a flexible leaf-spring having two spaced apart zig-zag sections, the leaf-spring incorporated within the body, where one of the two of zig-zag sections is located between the head member and the neck member, and the other one of the two of zig-zag sections is located at the beginning of the handle member; (c) whereby the flexible leaf-spring increases the flexibility of the body of the toothbrush and the two zig-zag sections further increase the flexibility of the body of the toothbrush.

Defined more broadly, the present invention is a toothbrush comprising (a) a body having a handle member, a neck member and a head member; and (b) a spring means incorporated within the body for providing flexibility of the body and having at least one zig-zag section; (c) whereby the spring means increases the flexibility of the body of the toothbrush and the at least one zig-zag section further increases the flexibility of the body of the toothbrush.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A toothbrush, comprising:
   a. an elongated body having a handle portion, a neck portion and a head portion with bristles thereon, the handle portion having a front side and a back side, the front side having a thumb section for preventing slipping of a user's hand, and the back side having a palm section for preventing slipping of the user's hand; and
   b. an elongated flat flexible leaf-spring having a pair of spaced apart zig-zag sections, the leaf-spring integrally formed within said elongated body and partially extending into said head portion and substantially the entire neck and handle portions, where one of the pair of zig-zag sections is located between the head portion and the neck portion, and the other one of the pair of zig-zag sections is located at the beginning of said handle portion;
   c. whereby said flexible leaf-spring increases the flexibility of said elongated body of said toothbrush and said pair of zig-zag sections further increase the flexibility of said body of said toothbrush.

2. The toothbrush in accordance with claim 1 wherein said elongated body is made of plastic material.

3. The toothbrush in accordance with claim 1 wherein said flexible leaf-spring is made of flexible metal material.

4. The toothbrush in accordance with claim 1 further comprising a non slippery material formed on said thumb and palm sections.

5. A toothbrush, comprising:
   a. a body having a handle member, a neck member and a head member, the handle member having a thumb area and a palm area; and
   b. a flexible leaf-spring having two spaced apart zig-zag sections, the leaf-spring incorporated within said body, where one of the two of zig-zag sections is located between the head member and the neck member, and the other one of the two of zig-zag sections is located at the beginning of said handle member;
   c. whereby said flexible leaf-spring increases the flexibility of said body of said toothbrush and said two zig-zag sections farther increase the flexibility of said body of said toothbrush.

6. The toothbrush in accordance with claim 5 further comprising a non slippery material formed on said thumb and palm areas.

7. The toothbrush in accordance with claim 5 wherein said body is made of plastic material.

8. The toothbrush in accordance with claim 5 wherein said flexible leaf-spring is made of flexible metal material.

9. A toothbrush, comprising:
   a. a body having a handle member, a neck member and a head member; and
   b. leaf-spring means incorporated within said body for providing flexibility of said body and having at least one zig-zag section located at a location where one end of the head member adjoins one end of the neck member;
   c. whereby said leaf-spring means increases the flexibility of the said body of said toothbrush and said at least one zig-zag section further increases the flexibility of said body of said toothbrush.

10. The toothbrush in accordance with claim 9 wherein said body is made of plastic material.

11. The toothbrush in accordance with claim 9 wherein said leaf-spring means is a flexible flat leaf-spring.

12. The toothbrush in accordance with claim 9 wherein said leaf-spring means is made of flexible metal material.

* * * * *